May 2, 1967     H. W. SCHULZ     3,316,842
PROPULSION PRODUCT
Filed March 19, 1963
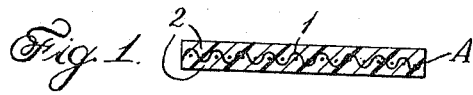
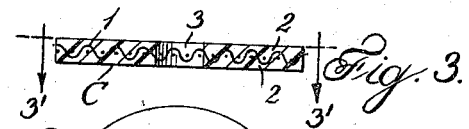
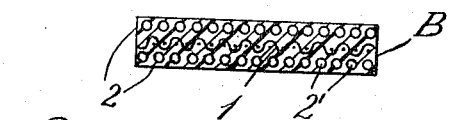
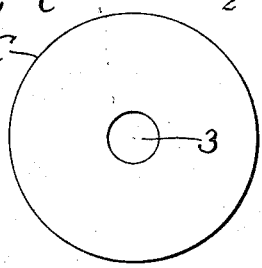
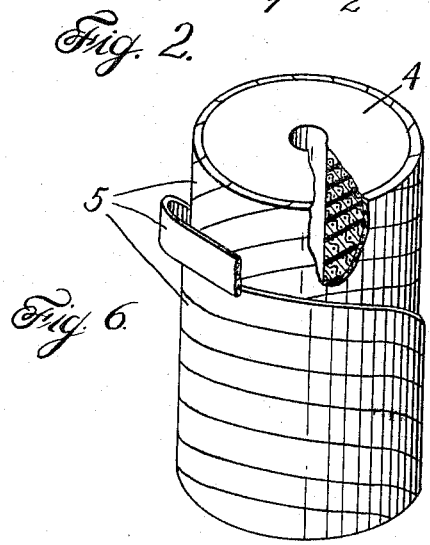
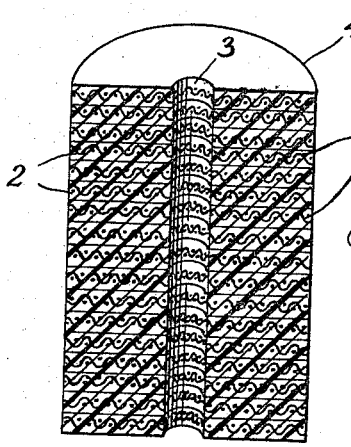
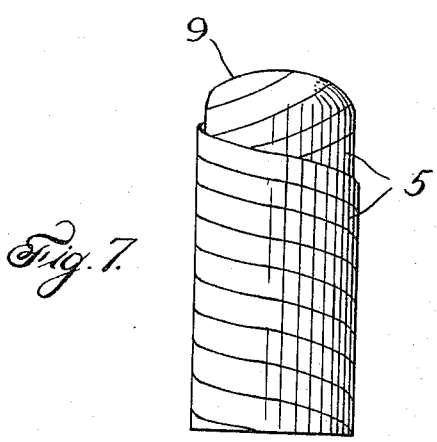
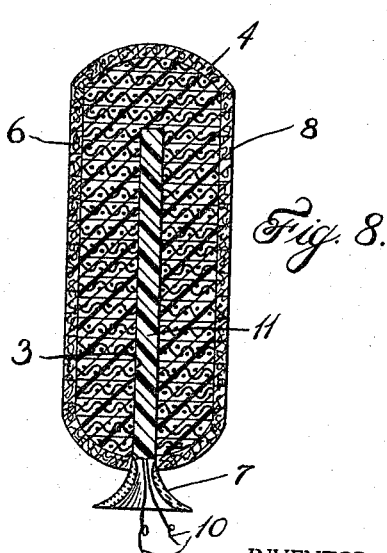
INVENTOR.
HELMUT W. SCHULZ
BY *George Skoler*
ATTORNEY

3,316,842
PROPULSION PRODUCT
Helmut W. Schulz, Charleston, W. Va., assignor to Union
Carbide Corporation, a corporation of New York
Filed Mar. 19, 1963, Ser. No. 266,324
5 Claims. (Cl. 102—100)

This invention relates to rocket propellant grains, rocket motors and their manufacture. More specifically, this invention relates to solid propellant grains and rocket motors containing these grains.

This invention involves a unitary laminated propellant grain, that is, a grain possessing a plurality of interbonded layers of solid propellant sandwiched between, and conversely about reinforcing support elements whereby to evolve a monolithic structure capable of absorbing some of the stress and strain developed under static and flight conditions peculiar to rockets. The novel grains of this invention contribute to the strength of the rocket to withstand the forces of gravity exerted during rapid flight while substantially minimizing or eliminating other unfavorable conditions known to occur with solid propellant grains.

The monolithic laminated propellant grains of this invention are of a construction suitable for use in any size rocket booster or engine, including large boosters such as those utilized for manned lunar flights. In addition, these grains are designable for controlled rapid burning without spasmodic changes in thrust resulting from, e.g., erosion. Further, the grains of this invention minimize the weight of the rocket exclusive of the propellant mass; minimize propellant slump as typically occurs with in situ casting of the propellant in a motor casing; minimize premature ignition of the grain and reduces exotherm problems typically associated with curing of solid propellants. Moreover, the grains of this invention are designable for exceedingly rapid and controlled burning. The grains of this invention may be designed so as to give different thrusts at different stages of burning.

The grains of this invention significantly minimize or eliminate various difficulties normally associated with sold propellants and at the same time provide a more convenient and quality controlled product for use in rockets.

The monolithic grains of this invention possess, as an important component, a multiplicity of particular propellant structural supporting elements, at least 4 thereof, each positioned in the grain angularly to the direction of flight of the rocket. These supporting elements greatly contribute to the strength of the grain yet do not represent a significant dead weight factor. Usually, the elements represent from 0.1 to 30 percent by weight of the monolithic grain. Furthermore, the supporting elements may represent one of the fuel ingredients of the grain and can actually contribute to the burning rate of the grain.

Of particular significance is a monolithic grain of the above structure possessing a perforation lateral, preferably normal to the supporting elements. In this type of construction, it has been surprisingly found that burning through ignition at the perforation may be exceedingly rapid yet controlled. This is principally caused by conductance of the heat into the propellant grain by the support element, particularly when the element is made of metal.

The supporting elements as part of the monolithic laminated grain structure are typically positioned in a direction latitudinal of the longitudinal axis of the grain, which for the purposes of this invention is the axis of the grain in the direction of flight of the rocket. Because of the superior strength of this element relative to that of the propellant, it is possible to avoid the serious erosion problem often associated with solid propellant grains when the forward portion of the grain is ignited prior to, or simultaneously with, the after portion of the grain.

The monolithic grain of this invention comprises a plurality of discs which have as their essential components the aforementioned supporting element and at least a layer of propellant. The supporting element desirably contains open pores throughout its structure. A layer of the propellant is deposited on the porous element and at least a portion of the layer extends through or into the spaces created by the pores. The resulting disc of the support structure and propellant are bonded to other discs of the same or similar composition to form a laminated grain possessing significant structural integrity.

The porosity of the supporting structure must be sufficient to allow exuding of uncured propellant matrix therethrough under conditions of atmospheric or greater pressure. This means that the pores should be of a size sufficient for impregnation thereof by the uncured propellant matrix selected for use.

The support element of this invention may be made of metallic and/or non-metallic material. The element need not be made of a readily oxidizable material, though a readily oxidizable support element is preferred. Desirably, the support element is made of a material which can be construed as a fuel and the most preferred materials of this type include the metals such as aluminum, beryllium, silicon, zirconium, magnesium, titanium, and copper. Other metals such as steel or alloys of the aforementioned metals also may be used. Of this class of metals aluminum and beryllium are most preferred due to their extremely low weight.

Non-metallic materials which may be used in lieu of or in conjunction with the aforementioned metals include polyamides of the nylon class (such as polyhexamethylene adipamide, polycaprolactam and/or polypyrollidone), polyesters (such as polyethylene-terephthalate and polycaproates), rayon (such as those made by the viscose, acetate, cuprammonium or nitrate process), cellophane, polyethylene, polypropylene, cotton, fiber glass, polyvinylchloride, polyacrylics (such as polyacrylonitrile and the polyesters of polyacrylic acid), polytetrafluoroethylene, and the like.

The support element is preferably in the form of a sheet, that is, a material possessing two broad surfaces, the boundaries of each possessing a common edge or edges which are thin relative to the length and breadth of each of the surfaces. Typically, the edge has a thickness not greater than about 0.125 inch and not smaller than about 0.001 inch. Of course, the thickness of the edge is dependent upon the strength of the sheet for the purposes of this invention and hence greater or smaller thicknesses than above indicated are within the purview of this invention.

The porosity of the support element is represented by open voids within the element which voids are at least substantially bounded by the element itself. As indicated previously, the size of each void should be sufficient to allow impregnation thereof by the uncured propellant matrix and preferably, the voids are of sufficient size to allow the propellant matrix to completely pass therethrough. The total area of the voids, which is the sum of the cross-sectional areas of the voids parallel to at least one of the surfaces of the sheets, should be at least 5 percent of the total area of at least one of the two surfaces of the support sheet.

The sum of the sheet thickness is desirably not in excess of 75 percent of the length of the monolithic grain determined as the length of the grain axis normal to the supporting elements.

The voids in the supporting element may be randomly dispersed therein, but are preferably substantially uniformly distributed across the surfaces of the element.

Thus, a support element of the aforementioned materials in the form of an open-weave fabric, a mesh, screen or multi-perforated disc is significantly desirable preferably when arranged in the shape of a sheet. Most significant results have been obtained utilizing an open-weave fabric, screen or mesh. The screen and mesh may be made of metal in the form of interwoven flat filaments or wires such as is characterized by a basket weave arrangement. Significantly desirable metals from which the screen or mesh may be constructed include aluminum, magnesium and/or beryllium; preferably aluminum. The open-weave fabric is typically made of filaments or strips of the aforementioned non-metallic material.

To the support element there is deposited a layer of propellant matrix of suitable composition for the intended use. As pointed out in Sutton; "Rocket Propulsion Elements," Second Edition, published by John Wiley Sons, Inc., New York, N.Y., particularly at Chapter 10, a variety of solid propellant compositions may be employed depending upon the type of propulsion system desired. Moreover, Sutton points out that the resulting grain may be designed in many geometric patterns (see Chapter 9) depending upon the intended use of the rocket.

The exact propellant composition and geometric pattern of the grain is not critical in the broad aspects of this invention. On the other hand, most significant, in terms of overall advantages, in the unique grain of this invention containing a perforation therein that acts as a burning front.

The selection of the propellant per se is dependent upon the burning rate and thrust desired. This invention provides an additional factor for determining the burning rate in that the arrangement of the laminate structure greatly contributes to the rate of burning particularly when the support element represents a metallic fuel. Hence, the selection of propellant should also take into consideration the selection of the support element. For the purpose of more specifically characterizing this invention there is hereinafter discussed, in detail, a variety of propellant compositions useable for making the grain of this invention.

The propellant typically comprises three elements, to wit, an oxidizer, a fuel, and a binder for both.

The binder represents an additional fuel material which contributes to the pressure build-up within the rocket motor and hence contributes to the thrust achieved on propulsion. Very importantly, it serves the function of binding together the fuel, oxidizing and support element components of the grain.

Since the grains of this invention obtain enhanced structural reinforcement from the aforementioned support elements in the form of porous sheets, the selection of the resinous binder encompasses a greater choice than is the case with a propellant composition cured in situ within the motor casing in accordance with prior art techniques.

Moreover, since the support element possesses an intimate relationship with the propellant, the support element can be made of materials other than those disclosed above such as those which can chemically interreact with the propellant binder system whereby to provide a more knitted structure. For example, the reinforcing elements can contain reactive sites such as hydroxyl, carboxyl, and/or amine groups which can participate in the curing and cross-linking reaction to which the resinous binder must be subjected after it is shaped upon the support element. Thus, polyvinyl alcohol films (or sheets) or porous films (or sheets) of other chemical compositions having the aforementioned chemical characteristics may be employed as reinforcing structures which form a bond with the binder by reaction of the film's reactive sites with those within the binder. Thus, the binder can contain complimentary sites such as carboxyl when the sheet has reactive hydroxyl and/or amine groups, or isocyanate when the sheet contains reactive hydroxyl and amine groups. In addition, the binder may possess reactive hydroxyl and/or amine groups when the supporting element possesses reactive carboxyl or isocyanate groups. Other examples of such elements include ethylene-vinyl acetate copolymers hydrolyzed to produce pendant hydroxyl groups, similarly hydrolyzed vinyl chloride-vinyl acetate copolymers, copolymers and terpolymers of vinyl chloride in which maleic acid is one of the comonomers, copolymers of ethylene and acrylic acid or hydrolyzed copolymers of ethylene and acrylic acid esters, hydrogenated copolymers of ethylene and carbon monoxide, and polycarbonamides containing polymers which have been treated with formaldehyde to produce pendant methylol groups on the nitrogen atoms of the chain, such as N-methylol substituted polyacrylamide-alkyl acrylate polymers.

The binder employed in this invention is desirably a resin system having a rapid curing rate. This is advantageous for rapid manufacture of the propellant disc when many hundreds of such discs are employed in the monolithic grains of this invention.

Suitable propellant binder systems may contain, as polymeric components, plasticized cellulose nitrate systems in all of the variations in which they are now found in the formulation of solid propellants. Typically, the cellulose nitrate is employed in a form such as Olin Mathieson Fluid Ball Powder or Du Pont Nitrocellulose Resin. Suitable plasticizers for these cellulose nitrate systems include such nitrate esters as nitroglycerine, diethylene glycol dinitrate, triethylene glycol dinitrate, petrin, trimethylolethane trinitrate and the like, whereby to provide, in addition, a double-base system.

Several resinous binders contemplated for use in the present invention include homopolymeric vinyl chloride, or copolymers of vinyl chloride with such monomers as vinyl acetate, vinylidene chloride, and ethylene, which homopolymers or copolymers are commonly used in organosols or plastisols. These materials can be extrusion molded, calendered, or fused in accordance with well known plastisol processes. Typical plasticizers therefor include dioctyl phthalate, dioctyl adipate, and/or dioctyl sebacate.

A most convenient vinyl resin for use in this invention is an ethylene-vinyl acetate copolymer usually plasticized with a compound such as dioctyl sebacate. Various other vinyl resins may be substituted for those described above and the instant invention is not restricted to any specific binder other than that the binder in conjunction with the fuel and oxidizer desirably possesses properties as defined herein.

Other binder systems somewhat similar to those described above derive their ultimate properties by a cross-linking reaction. These are also suitable for use in this invention. Thus, polyurethane resins in which cross-linking is produced by reaction of isocyanate and hydroxyl groups, or polyester systems which utilize epoxy-carboxy reactions for cure, are most suitable as binders in this invention.

Another significant class of binders for the purposes of this invention include those possessing elastomeric properties. Many of these are composed principally of a polymeric hydrocarbon skeletal chain. Illustrative of these materials are butadiene-styrene copolymers (GRS) rubbers, polybutadiene (cis or trans) rubbers, poly-cis-isoprene rubber, butyl rubber (polyisobutylene copolymers), silicon rubber (e.g., elastomeric polydimethylsiloxane), and the like. Specifically desirable materials are polymers possessing a hydrocarbon skeletal chain and extra-linear and/or chain terminating functional groups such as carboxyl, amino, and/or hydroxyl. Illustrative of this class are carboxylated polybutadiene, hydroxylated polybutadiene, and aminated polybutadiene. These compounds may be cured by interreaction with a polyfunctional compound wherein the functional group is complimentary to the functional group of the polymer. Thus, the curing agent may be a diamino compound, a polyhydroxylated compound (polyol), an amino-hydroxyl containing compound, a polycarboxylic containing compound, a polyisocyanate containing compound, a hydroxy carboxylic containing compound and/or an amino carboxylic containing compound. Many of these functional containing hydrocarbon polymers are commercially available and a most significant member of this group is Butarez CTL Polymer Type II, made by the Phillips Petroleum Company of Bartlesville, Oklahoma, which is indicated to be polybutadiene possessing reactive polycarboxylic acid groups. This material is most conveniently cured by interreaction with a compound such as tris[1-(2-methyl)aziridenyl]phosphine oxide or a mixture of tris[1-(2-methyl)aziridenyl]phosphine oxide and phenyl bis[1-(2-methyl)aziridenyl]phosphine oxide.

The exact selection of binder for this invention, when employed, is not critical and forms no essential feature of this invention except that when employed in conjunction with the fuel and oxidizer it should produce a curable propellant mass which in the uncured state is capable of filling at least some of the pores of the support element.

The selection of fuel and oxidizer and amounts of each is an interrelated problem well understood by the skilled worker, see Sutton, supro, (at Chapters 9 and 10).

Particularly desirable oxidizers include ammonium perchlorate, lithium perchlorate, mixtures of the two, ammonium nitrate, hydrazine perchlorate, hydrazine nitroformate, and nitronium perchlorate. It is to be noted that some of these oxidizers are exceedingly reactive, particularly on contact with a fuel, and hence are not normally employed in conventional premix casting techniques. However, the process of the instant invention allows these highly reactive oxidizers to be thoroughly distributed with the fuel and binder system without abrasion thereby greatly minimizing the danger of premature reaction. A particularly reactive oxidizer which supplies significant quantity of oxygen is nitronium perchlorate. This oxidizer may be employed in this invention in uncoated or coated (encapsulated) condition by imbedding oxidizer particles (pelletized and unpelletized) into a propellant matrix, which typically comprises the binder and fuel. Since the amount of propellant deposited upon the support sheet in the manufacture of the propellant disc of this invention represents a relatively thin layer, substantial distribution of the oxidizer within the matrix is readily effected by this imbedding technique.

Coating or encapsulation of these exceedingly reactive oxidizers may be readily effected by a variety of vapor phase deposition techniques. For example, reactive oxidizer crystals, such as nitronium perchlorate crystals, may be coated by vapor deposition techniques with a light metal and/or a polyaromatic composition possessing electron attracting substituents. These techniques are disclosed in commonly assigned copending applications Ser. Nos. 176,630, filed Mar. 1, 1962; 176,625 filed Mar. 1, 1962; and 223,920, filed Sept. 17, 1962, the disclosures of which are incorporated herein by reference. Particularly desirable are crystals of nitronium perchlorate encapsulated or coated with poly-para-xylylene resin substituted on the aromatic ring with a group having a sigma para value from about zero to about +0.8.

The third component, other than the binder and oxidizer, is the fuel. The fuel, as pointed out above, may comprise in part, the cured binder composition. Typically, however, fuel refers to a material possessing a high heat of reaction with oxygen, a high density and a low molecular or elemental weight. Usually, the selected fuel represents a compromise between these three factors. Illustrative of desirable fuel is finely divided metal powder, that is, a metal element in metallic form and substantially free of oxide structure. Illustrative of these are metal powders such as aluminum, magnesium, beryllium, silicon, zirconium, and titanium, or alloys of these. Hydrides of these metals are also included. Other metals taught in the art may be substituted for the above.

A distinctive advantage of the instant invention resides in the fact that the grain may be composed of fuel-rich and oxidizer-rich components. Materials illustrated above, such as the metallic fuels and the salt oxidizers, are representative of these components. They usually possess little structural strength when intermixed alone or when bonded together in a binder system. In fact, such materials in combination with the binder typically deprive the binder of strength it possesses in the cured state absent the presence of such material. Because of the structural element upon which these propellant compositions are deposited the over-all grain possesses a strength greater than when the structural elements are not employed. By use of a porous structural element, as defined above, significantly greater strength is given to the resulting propellant grain.

Moreover, exceedingly reactive oxidizer and fuel combinations, that is, those oxidizers and fuels which on contact at normal or greater temperatures and pressures tend to interreact, may be incorporated in the grain of this invention to become part of the cured grain structure without premature interreaction. This can be achieved by the aforementioned coating of one or both of the oxidizer and fuel ingredients so as to effect the capsulation thereof followed by addition of each to the binder system. The combination of binder and coating serves to prevent the oxidizer and fuel from contacting during the periods prior to ignition. A most desirable system involves premixing the fuel and binder, thereby to form an uncured composition which is deposited on the support element. This results in a support element having a layer of uncured matrix, a portion of which is deposited within the open pores or interstices of the support element. There is then imbedded into the uncured composition, an encapsulated (coated) oxidizer such as nitronium perchlorate. Preferably, the encapsulated oxidizer is imbedded in the matrix in a prearranged geometric pattern whereby to provide for excellent dispersion of the oxidizer for combustion purposes. There may be deposited upon this uncured matrix an additional layer of uncured propellant composition of the same or similar composition. In this way, the oxidizer is protected from abrasive or other heat inducing conditions which may cause premature reaction.

In other cases, where the oxidizer and fuel do not react at low temperatures, they may be premixed in a binder system and extruded upon the support element without danger in pre-ignition. Since the system allows for curing of the premixture of the oxidizer and binder prior to incorporation in the rocket shell, dangers which accrue from pre-ignition are greatly minimzed. Moreover, since the total cure of the monolithic grain structure is effected or is substantially effected prior to encasement within the rocket motor, cracking of the grain whereby to create fissures therein is not a significant problem. If such fissures exist, they cannot be propagated through the grain structure because of the multiplicity of reinforcing (support) elements which are placed therein.

The propellant usually contains from 6 to 40 percent by weight thereof the binder, from 30 to 85 percent by weight of the propellant of the oxidizer, and from 0.5 to 30 percent by weight thereof the fuel based on the weight of propellant matrix.

Greater or lesser quantities of each are within the purview of this invention and since this invention is not specific to any preferred propellant composition, this invention is not intended to be limited to any specific propellant composition.

The structural (support) element as noted above, typically possesses the shape of a sheet. The sheet may be rectangular, square, cylindrical, oval, etc. The particular configuration of the sheet is optional and usually possesses the latitudinal or side dimensions of the total grain structure. For example, a monolithic grain having a diameter of 10 feet is usually made up of plurality of parallel supporting elements in the form of sheets of the same diameter. To each of the elements is applied a propellant matrix typically comprising a premixture of the binder, oxidizer, and fuel. As mentioned above, the premixture may only comprise the fuel and binder and the oxidizer may be imbedded at a later stage. This mixture is then deposited upon the support element and leveled off utilizing a mechanism such as a doctor blade. Usually the thickness of the layer of propellant mixture deposited on each of the elements does not exceed 1.0 inch, and typically is greater than 0.015 inch.

Alternatively, a layer of propellant may be deposited in a mold having the configuration of the supporting element. To the top of the layer may be deposited the element and atop the element may then be deposited a further layer of propellant thereby to form a disc of the supporting element sandwiched between propellant matrix. The above procedure may be altered by not depositing an upper layer on the supporting element. Of course, the number and arrangement of the layers and elements is determined by the materials selected, the size of the grain desired, and the particular use to which the grain is put.

More than one propellant composition may be applied to the support element and each may have a different burning rate. Thus, if the dic possesses a perforation, the propellant in the proximity of the perforation and radially extending from said perforation to selected radial points may be composed of a faster burning composition than the propellant composition filling the remainder of the disc extending from said points to the periphery of the disc. In this manner the disc possesses more than one burning rate. Alternatively, or in conjunction therewith, the total monolithic laminated grain of this invention may possess a plurality of different propellant compositions situated at different layers within said grain whereby to produce a predetermined burning pattern. The exact propellants selected would normally depend upon the intended use of the grain.

The uncured matrix layer and supporting element combination, in the form of a disc, is brought to a temperature sufficient to effect at least a partial cure of the binder. If the binder comprises a plasticizer which is to serve as a bonding agent for adherence to other layers of cured propellant matrix, then a final cure may be effected in the initial heating step. The substantially cured layer of propellant bonded to the supporting element is then combined with other such discs to effect sandwiched or laminated propellant layers with supporting elements interspersed between the layers. The discs are usually stacked whereby to effect a structure possessing a unitary configuration and geometric pattern for the particular use desired.

The laminated structure may be put under pressure and heat to effect a final curing and bonding of the various layers of propellant whereby to product the monolithic laminated grain structure of this invention. Preferably, however, the use of heat is avoided by employing as a binder a polymeric system which slowly proceeds to a fully cured condition at essentially ambient temperatures.

Alternatively, a number of propellant sheet discs in a finally cured or a substantially cured state suitable for inter-bonding may be heated under pressure to effect an intermediate laminated grain structure. The exposed flat surfaces of the grain structure may then be coated with a bonding agent such as a plasticizer and a plurality of these intermediate laminated grain structures may be pressed to form large monolithic laminated grains of this invention.

This latter technique is most convenient in the construction of a large space booster where the intermediate laminated discs may be formed into the grain structure at the site of the rocket. Thus a plurality of intermediate laminated discs may be constructed at a convenient place, removed from the site of the rocket booster or motor, combined at the site either within a rocket casing or prior to establishing a casing thereabout. In this fashion, the amount of heat applied is considerably less than that which would be necessary in the usual casting procedure and the possibilities of the cracking or fissure formation is significantly reduced.

In order to more specifically illustrate various embodiments of this invention recourse is made to the drawings which illustrate specific operations of this invention but to which this invention is not limited.

Referring to FIGURE 1, there is shown a cross-section illustration of a propellant-sheet disc coming within this invention.

FIGURE 2 is a cross-section view of a propellant-sheet disc particularly illustrating imbedded coated oxidizer particles in a propellant layer.

Referring to FIGURE 3, there is shown a cross-section view of a circular disc of the propellant-sheet combination having therein a large open perforation.

Referring to FIGURE 4, there is shown a top view of the disc described in FIGURE 3 as taken along lines 3'—3'.

Referring to FIGURE 5, there is shown a cross-section view of a monolithic laminated grain within the purview of this invention possessing therein a perforation circumscribing the longitudinal axis of the grain.

FIGURE 6 illustrates a cut-away view of the monolithic grain of FIGURE 5 to which is applied a reinforced propellant wrapping. This represents a further embodiment of this invention further discussed below.

Referring to FIGURE 7, there is shown a substantially wrapped monolithic grain with a structural inducing grain wrapping as illustrated in FIGURE 6.

Referring to FIGURE 8, there is shown a cross-section illustration of a rocket booster containing the monolithic grain of this invention.

FIGURE 1 illustrates a cross-section view of a support screen 1 having deposited thereon and therebelow propellant layers 2. The combination of screen and propellant forms a propellant disc A which may be combined to form laminated grains of a plurality of geometric configurations.

A disc as illustrated in FIGURE 1 may be formed by intermixing a resinous binder such as polybutadiene having pendant or chain terminating carboxyl groups, a fuel such as aluminum metal powder, an oxidizer such as ammonium perchlorate and a curing agent for the binder which in this case is typically a chain extending agent. Mixing is conveniently effected in any one of the well known blenders capable of mixing high viscosity compositions (50,000 to 500,000 centipoises or more at 25° C.), such as a Reed sigma blade horizontal mixer or a Baker-Perkins vertical mixer, etc. The mixture is then extruded or merely deposited by hand on top of screen 1 to form a layer 2 of a specific thickness. The desired thickness can be effected by merely resting the screen on a solid base and drawing the propellant mixture across the screen with a doctor blade. The thickness of the propellant may be governed by drawing the blade over raised guide bars situated at the periphery of the screen. As the doctor blade is drawn across the screen, the mixture is forced in a substantially uniform layer 2 over the screen. The screen may then be turned over and an additional layer of propellant 2 is spread across the uncoated surface of the screen. This thickness is likewise controlled by guide bars at the periphery of the screen.

Alternatively, the mold may be constructed having the dimensions of the periphery of the screen with side walls representing the thickness of the lowest propellant layer 2. To the mold is introduced the propellant mixture and a doctor blade is passed thereover while resting on the side walls to form a lower layer 2 of propellant of substantially uniform thickness. Atop of this layer is fitted screen 1. The side wall is increased to a specified height for addition of further propellant mixture to the top of screen 1. The additional amount of propellant is thereupon deposited on the screen and drawn out to a layer of substantially uniform thickness with a doctor blade.

Disc B of FIGURE 2 may be made in the same manner as disc A of FIGURE 1, except that the oxidizer is not incorporated therein by premixing with the binder and fuel. In the manufacture of the disc of FIGURE 2, a premixture of the fuel, e.g., powdered aluminum, and the binder, e.g., carboxy chain terminated polybutadiene (Butarez CTL, Type II) with a curing agent (such as tris[1-(2-methyl)aziridenyl]phosphine oxide admixed with phenyl-bis[1-(2-methyl)aziridenyl]phosphine oxide) is deposited as a layer 2 on screen 1. There is then imbedded in layer 2 the required amount of oxidizer in the form of resin or metal encapsulated crystals 2' of a size typically ranging from 25 mesh to ⅟₁₆ inch. The aforementioned premixture applied in the manufacture of disc B may also contain less energetic oxidizers (such as ammonium perchlorate) in an amount less than that which is sufficient to convert substantially all chemical elements making up the disc to an oxidized state, e.g., hydrogen to $H_2O$ and/or $HCl$, carbon to $CO$, $Al$ to $Al_2O_3$, nitrogen to a nitrogen oxide, etc. The remainder of the oxidizer for substantial or complete oxidation of the disc may be provided by the imbedded encapsulated oxidizer.

FIGURE 3 illustrates a cross-section view of disc C similar to that of FIGURE 1 except that the disc possesses a large perforation 3 of a specific shape in its central interior. Whereas the disc A of FIGURE 1 may have an outside periphery of any geometric shape, the periphery of disc C is cylindrically and concentrically disposed with respect to open perforation 3. Open perforation 3 is better illustrated in FIGURE 4 which shows a top view of disc C taken along lines 3'—3'. The disc C may be constructed as described above for FIGURES 1 and 2. The open perforation 3 is depicted as circular, a design which favors progressive burning but any perforation design may be employed, e.g., a star shaped perforation known to give substantially neutral burning.

The discs illustrated in FIGURES 1, 2, and 3 may be completely or partially cured dependent upon the composition of the binder, keeping in mind, of course, that the binder may be the fuel and binder in a single instance. If the binder is a material which comprises a non-curable plasticizer (such as dioctyl phthalate) capable of acting as a bonding agent when the propellant matrix is completely cured then a total and final cure of the individual disc may be immediately effected. But if the propellant matrix is not composed of a non-curable plasticizer then the cure should be partial so that propellant layer 2 possesses enough tackiness to adhere to another partially cured disc to form a bond of low tensile strength.

It is important to point out that the discs may be shaped from larger discs by cutting or stamping out the desired shape. For example, a specifically shaped disc may be cut from a larger shaped disc with a pre-shaped cutter in much the same manner as cookies are stamped from a sheet of dough.

FIGURE 5 illustrates a cross-section view of a monolithic laminated grain 4 possessing therein a plurality of screens 1 having in contact therewith propellant layers 2. Surrounding the longitudinal axis of grain 4 is cylindrical open perforation 3. Grain 4 is constructed by stacking a plurality of propellant discs C while, e.g., in partially cured state. To the top of the stack of discs is added sufficient weight to effect most intimate contact between the various discs in the stack and substantially eliminate voids between the discs. After substantial pressure has been effected and voids have been substantially eliminated, heat is applied to the stack if needed for curing, to effect total cure thereof or curing is effected at ambient temperature. Upon final cure, which is determined by the non-stickiness of the propellant mass, the laminated monolithic grain of this invention is effected.

As indicated above, a plurality of discs, e.g., as described in FIGURE 3, may be stacked in a total number less than that desired for a finished monolithic grain. Pressure may be applied to this stack and upon at least partial cure a small intermediate grain is produced. This grain may be then carried to the site of use, typically the site where the rocket motor is assembled. The top and bottom flat surfaces of the intermediate grain are coated with an adhesive agent or additional binder and various intermediate laminated stacks are uniformly laid one over the other in the motor or exterior of the motor. The grains are then pressed together, and with or without additional heat, are firmly bonded to each other to produce the final monolithic grain.

A further advantage of this invention resides in the fact that the monolithic grain may be employed as a mandrel for the application of further solid propellant. For example, the monolithic grain 4, illustrated in FIGURE 5, may have a diameter of about 5 feet and thereafter be wrapped with a reinforcing, spiralling and substantially continuous sheet of propellant material to a greater diameter. Such materials are disclosed in copending application Ser. No. 128,894, filed Aug. 2, 1962, in the name of Helmut W. Schulz and Julian K. Rose, the disclosure of which is incorporated herein by reference.

This is best illustrated by reference to FIGURE 6 which depicts a cut-away view of the monolithic gkrain illustrated in FIGURE 5 having wrapped thereabout a continuous sheet 5 of reinforced propellant. Sheet 5 typically comprises a support element of the type described above for the discs of this invention with a layer or layers of propellant deposited thereon. The propellants used in making sheet 5 are any of those systems described above. The resulting propellant sheet may then be partially or totally cured in the manner described herein and in copending application Ser. No. 128,894.

Total or partial curing of the propellant sheet may be effected continuously by laying propellant on a moving continuous support element and thereafter applying heat to the moving resulting sheet of propellant and support element. Continuous sheet 5 is typically wrapped about the monolithic laminated grain of this invention as illustrated in FIGURE 5 by peripherially extending sheet 5 about the grain from an initial point on the grain (preferably at the top or bottom thereof) in a helical direction so that the edge of each sheet abuts or overlaps an edge of a different sheet or an opposite edge of a different and previous part of the same sheet. Thus, the wrapping 5 extends in an upward and downward spiral path as shown in FIGURES 6 and 7 whereby to form overlapping layers of continuous propellant sheet. Each layer typically is in the form of an opposite helix to its overlapping layer. The continuous sheet is applied under pressure by exerting tensions on the advancing end of the sheet during application. In this fashion, a very tight and strong wrapping is effected over the full of the monolithic laminated grain. This wrapping serves to effect a very strong over-all grain structure possessing extreme resistance to stresses and strains invoked during rocket use whether in flight or not. The wrapping is extended to the outer dimensions of the monolithic grain structure as illustrated in FIGURE 7 for grain 9. The angle of the helix may be variable.

The aforementioned wrapping may become securely bound to the monolithic grain by curing the layers while wrapped over the monolithic grain structure. This results in a unified grain of great stability. Most significant is the fact that the helical wrap serves the function as a pressure vessel prior to its combustion, as well as part of the propellant mass during combustion. As a result, the rocket casing may be considerably lighter and designed for pressures below those produced during burning of most of the monolithic laminated grain. By controlling the propellant composition and burning rate such that the rate of gas generation from combustion of the propellant diminishes as the burning progresses radially outward toward the motor case, the surface area increase can be compensated and offset to such a degree that the pressure, as burning approaches the case, will be well within the case limitations.

Referring to FIGURE 8, there is disclosed a rocket motor 8 possessing monolithic grain 4. Exterior of grain 4 is the outer casing 6 of the rocket which may be constructed by helically winding about the grain, fiber glass roving impregnated with epoxy resin, such as that shown in U.S. Patent No. 2,995,011. The impregnated fiber glass winding may be cured to form a hard, tough protecting layer.

At the bottom of rocket motor 8 is nozzle 7 openly connected to open perforation 3 located along the central longitudinal axis of grain 4. Ignition of this rocket may be effected by the use of any of the well-known igniter systems. A suggested igniter may comprise a styrofoam mass 11 extending through perforation 3 and to the top of nozzle 7. Completely wound within said styrofoam may be an electrical resistor such as wire 10, connected to an electrical source. The styrofoam is ignited by the resistor wire to combustion which in turn ignites the propellant.

Grains 4 of FIGURE 8 may be wrapped as shown in FIGURES 6 and 7. Thus, grain 9 of FIGURE 7 may be wholly substituted for grain 4 in the motor of FIGURE 8.

As pointed out above, this latter construction is most desirable insofar as the bonded layers of reinforced wrapped grain serves as a pressure vessel during burning of the grain. Thus, as the burning progresses from perforation 3, thereby to effect progressive burning, the outer wrapping serves as a substantial support and actually represents, for the purposes of this invention, part of the rocket casing. As a result, pressure created within the rocket during burning is contained not only by rocket casing 6 but also by propellant wrapping 5. The reinforced propellant wrapping 5 serves as part of the casing thereby minimizing the size, strength, and weight of the casings normally employed in rockets. This, of course, greatly reduces the dead weight factor caused by use of heavy casings.

Though the above discussion is limited to reinforced propellant wrapping sheets, the reinforced propellant wrapping may take other shapes including all of the variations disclosed in copending application Ser. No. 128,894.

The wrapping grain 5 bounding the monolithic laminated grain 4 may also be characterized as a laminated grain. It typically comprises a plurality of substantially parallel layers of solid propellant radially extending from a mandrel which in this case is the monolithic laminated grain. Each of said layers is in contact with a solid reinforcing (support) element whereby to form a wrapping layer and each extends in a helical direction.

It is desirable to have the wrapping layer comprising the propellant layer and solid support element, helically wound about the mandrel and to have each alternate helix spiralled oppositely to the helix contiguous thereto. Preferably, the wrapping grain is made of one continuous wrapping layer which first is fixed to the aforementioned mandrel and helically wound thereabout in a plurality of directions.

Thereafter, the casing can be wound about the final grain which is the composite of the monolithic laminated grain derived from the disc construction technique and the monolithic laminated grain derived from the wrapping technique. Encasement of the final grain may be accomplished by the technique previously illustrated.

Of some importance is the temperature at which curing of the grain is effected. Curing should not be attempted at a temperature range which causes any combustion or decomposition of either the oxidizer, fuel, or binder. Therefore, the highest temperature which should be employed is that which is sufficient to effect curing of the resin binder without deleteriously effecting the oxidizer and fuel. Desirably, the lowest convenient temperature at which hardening of the binder may be achieved is employed. The operational temperature is dependent upon the selected binder and some experimentation typically is necessary in order to determine the best curing temperature. Usually curing is effected below a temperature of 100° C. and desirably below 85° C., though higher temperatures may prove more desirable.

The following illustrates an operation of this invention and is not to be construed as limiting the scope of this invention.

1.334 pounds of Thiokol HC-434, a polybutadiene possessing terminal carboxylic acid groups, with a viscosity of 200,000 centipoises at 20° C., 1.422 pounds of finely divided aluminum powder having a weighed average particle size of 20 microns, 0.0012 pound of ferric octoate, 6.320 pounds of ammonium perchlorate crystals of 100 to 150 mesh, 2.140 pounds of ammonium perchlorate crystals of 20- to 50-micron size, 0.0286 pound of tris[1-(2-methyl)aziridenyl]phosphine oxide and 0.01795 pound of para[2,3 - epoxypropoxy(N,N - 2,3-diepoxypropyl)]aniline are thoroughly blended to form a viscous propellant mass of $6 \times 10^6$ centipoises at 60° C.

A mold in the form of a flat dish with a perpendicularly aligned straight side wall forming a circular outer periphery extending above the flat base of the dish and a six-point star shape inner perforation in the interior thereof is employed for making the disc. The outside diameter of the mold is 6.25 inches and the inside diameter measured as the interior of the side wall is 6.00 inches. The star shape perforation is concentrically disposed with respect to the periphery of the side wall and is defined by a 0.25-inch thick straight interior wall perpendicularly extending from the base of the dish in the same direction as the side wall. The interior diameter of the interior wall is 2.40 inches determined as the distance of the diametrically positioned points of the star. The base of the mold is uniformly flat and the walls commonly extend from the base for 0.125 inch.

The propellant mass is uniformly deposited in the mold to about one-half the height of the walls. Upon the top of the propellant layer is rested a $16 \times 16$ mesh 11 mil circular aluminum screen. The screen has a 6.00-inch diameter with a six-point star shape interior exactly conforming with that defined by the propellant mass in the mold.

To the top of the screen and between the walls is deposited additional propellant mass. The mass is leveled with a doctor blade to form a flat surface whereby to form a disc composed of an aluminum screen sandwiched between two layers of propellant.

The mold is heated to 80° C. and held at this temperature for 3.5 hours whereby to effect a partial cure. The propellant matrix exhibited a tackiness to touch when removed from the mold. Examination of the partially cured disc shows that screen openings are impregnated with propellant mass and that the cure effects an undefinable bond between the two layers through the screen openings.

The above procedure is repeated to produce 48 partially cured discs. The discs are then combined by aligning one on top of the other in a single mold arrangement as illustrated in FIGURE 5 whereby to form a 6.0 inch tall stack. A pressure of 50 pounds per square inch is applied to the top of the stationary stack and the stack is heated to 80° C. The pressure and heat are applied for 36 hours.

The resulting monolithic laminated grain has an outside diameter of 6.0 inches, an inside diameter across diametrically related points of the star perforation of 2.40 inches and a height of 6.0 inches. This grain is then encased with top and bottom steel plates, 0.30 inch in thickness and 6.0 inches in diameter. The bottom plate has a 2.5-inch diameter bottom hole to which is fitted a nozzle which opens into the star shape perforation in the grain. An epoxy resin impregnated fiber glass wrapping is fitted about the side, top and base of the grain and steel plates in the fashion illustrated in U.S. Patent No. 2,994,011.

The resulting rocket exhibits no propellant slump on standing after 25 days; static firing exhibits no erosion of the grain. The aforementioned grain, designed for a specific impulse of 250, shows a specific impulse of 249.3 on firing.

Ignition of any rocket or rocket booster motor employing the embodiments of this invention may be effected with any of the known ignition systems. Moreover, the geometric shape of the grain of this invention may be varied according to the needs of the engineer.

Though the above relates to a plurality of specific details, this invention is to be only limited by such details as appear in the claims.

What is claimed is:

1. A laminated rocket propellant grain having a longitudinal axis, said grain comprising a multiplicity of contiguous and interbonded layers of propellant composition arranged latitudinally with respect to said longitudinal axis, each of said layers having embedded therein a fuel-contributing reinforcing element disposed normal to the longitudinal axis, each of said layers having a perforation extending therethrough, which perforation defines an inner wall in said layer, the inner walls of all layers in the grain being in longitudinal alignment and forming an unrestricted burning front parallel to the longitudinal axis of the grain.

2. A laminated rocket propellant grain having a longitudinal axis, said grain comprising a multiplicity of contiguous and interbonded layers of propellant composition arranged latitudinally to said longitudinal axis, each of said layers having embedded therein a planar porous fuel-contributing reinforcing element disposed normal to the longitudinal axis; each of said layers having a perforation extending therethrough, which perforation defines an inner wall in said layer, the inner walls of all layers in the grain being in longitudinal alignment and forming an unrestricted burning front parallel to the longitudinal axis of the grain.

3. A laminated rocket propellant grain having a longitudinal axis, said grain comprising, in combination, a multiplicity of contiguous and interbonded layers of propellant composition arranged latitudinally with respect to said longitudinal axis, each of said layers having embedded therein a fuel-contributing reinforcing element disposed normal to the longitudinal axis, each of said layers having a perforation extending therethrough which perforation defines an inner wall in said layer, the inner walls of all layers in the grain being in longitudinal alignment and forming an unrestricted burning front parallel to the longitudinal axis of the grain; and an outer wrapping of reinforced propellant composition sheet material, the reinforcing elements of which are of a fuel-contributing material.

4. A laminated rocket propellant grain according to claim 3 wherein said outer wrapping of reinforced propellant composition sheet material consists of a multiplicity of layers, each layer formed with a helically abutting wound strip of said reinforced sheet material.

5. A laminated rocket propellant grain according to claim 4 wherein each abutting wound strip layer of said reinforced sheet material is wound in a helical progression opposite to its respective contiguous layer.

References Cited by the Examiner

UNITED STATES PATENTS

| | | | |
|---|---|---|---|
| 2,926,613 | 3/1960 | Fox | 102—98 |
| 2,974,596 | 3/1961 | Allen | 102—98 X |
| 2,986,092 | 5/1961 | Murphey | 102—98 |
| 2,995,091 | 8/1961 | Haymes et al. | 102—98 |
| 3,067,686 | 9/1962 | Coover et al. | 102—98 |

OTHER REFERENCES

"Systems for Ignition of Solid Propellants," by J. W. Rabern, paper presented at the American Rocket Society 14th Annual Meeting, Washington, D.C., Nov. 16–20, 1959.

BENJAMIN A. BORCHELT, *Primary Examiner.*

SAMUEL FEINBERG, *Examiner.*

R. F. STAHL, *Assistant Examiner.*